Inventor:
Kenneth L. Boring,
by Paul A. Frank
His Attorney.

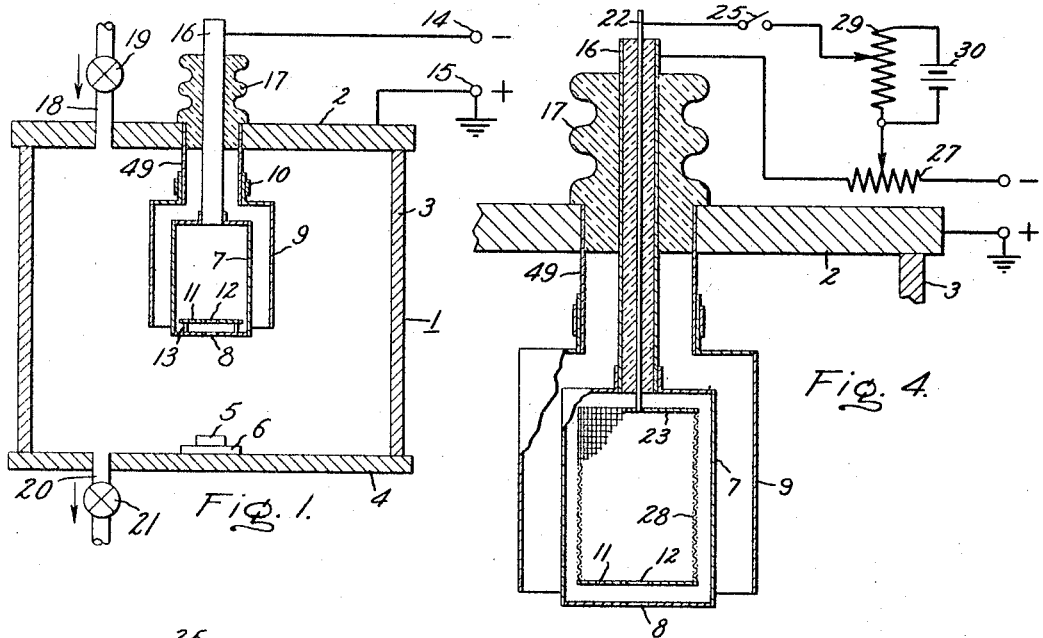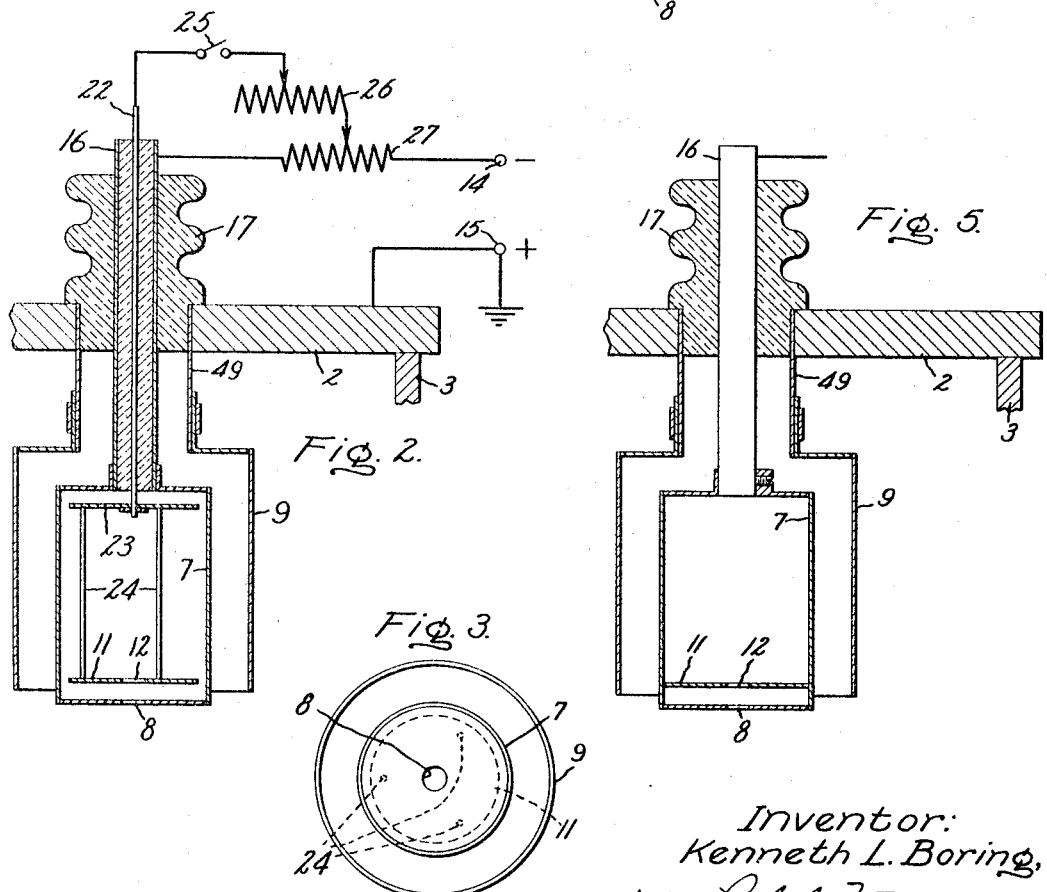

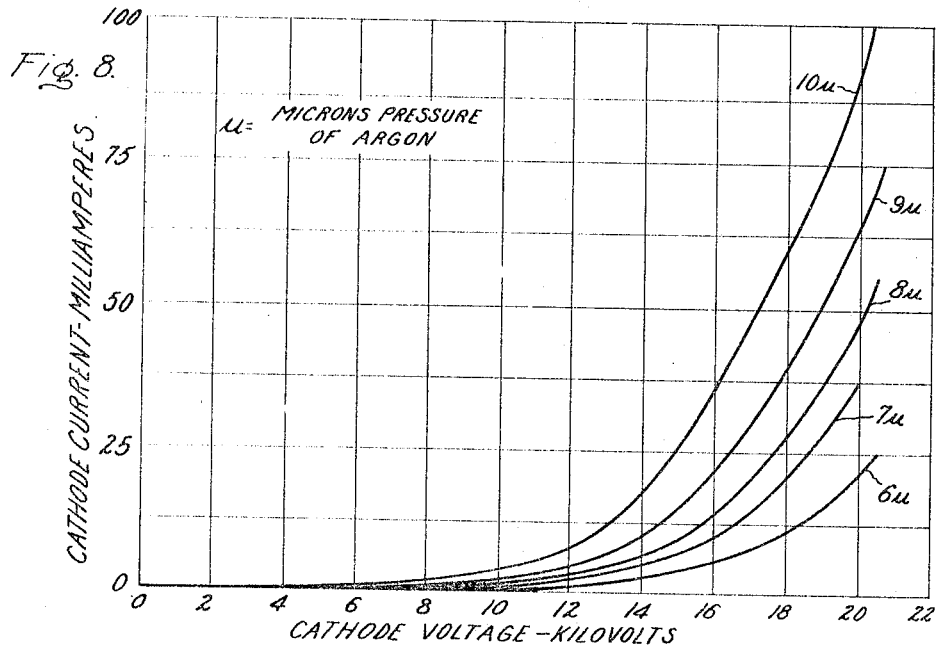
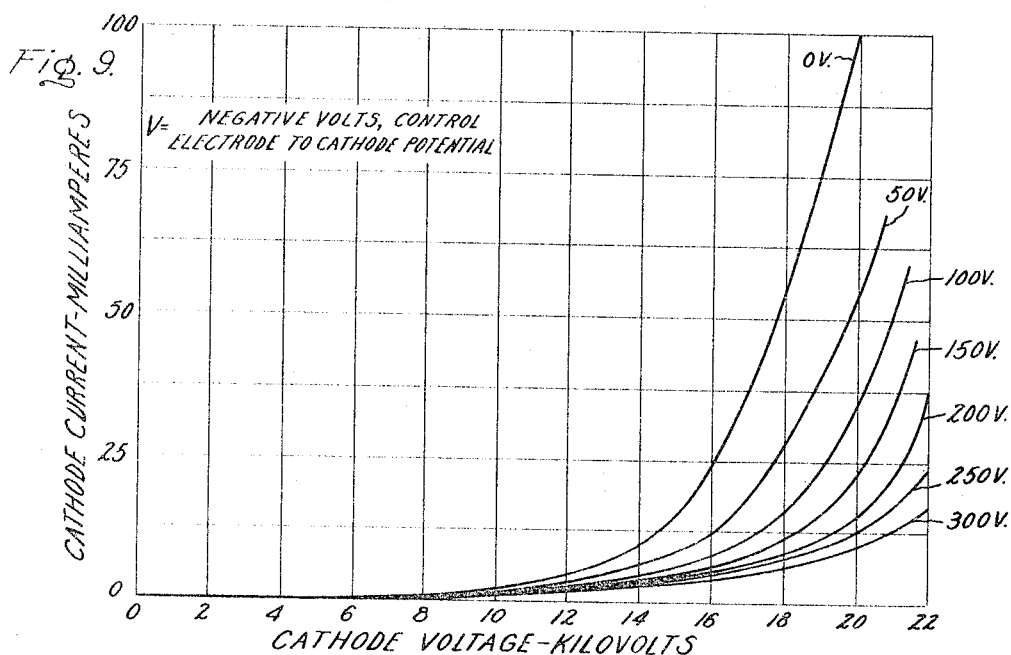

Inventor:
Kenneth L. Boring,
by Paul A. Frank
His Attorney.

United States Patent Office 3,320,475
Patented May 16, 1967

3,320,475
NONTHERMIONIC HOLLOW CATHODE ELECTRON BEAM APPARATUS
Kenneth L. Boring, Scotia, N.Y., assignor to General Electric Company, a corporation of New York
Filed June 20, 1963, Ser. No. 289,357
15 Claims. (Cl. 315—108)

My invention relates to certain improvements in electron beam irradiation apparatus of the gaseous beam type, and in particular, to an improvement in the manner of generating the electron beam by nonthermionic means and in controlling the beam.

Apparatus for generating electron beams by utilizing a heat source which effects emission of electrons from a cathode by thermionic means are well known. Also well known are the gaseous discharge type of apparatus, such as the thyratron tube, which generates a diffuse type discharge in a gaseous medium by either thermionic or non-thermionic means. The diffuse discharge may be adapted to form a beam at a low efficiency by employing a suitable geometry of focusing apertures in combination with electromagnetic or electrostatic elements.

Therefore, one of the principal objects of my invention is to provide an apparatus for efficiently generating an electron beam by nonthermionic means.

One shortcoming of prior electron beam apparatus is the difficulty in controlling the intensity or magnitude of current in the beam without affecting its focus and without variation in the potential applied between the cathode and anode of the apparatus.

Another object of my invention is to obviate this shortcoming and to provide means to vary the intensity of the beam over a wide range without affecting its focus and independently of the cathode-to-anode potential.

A recent development in the electron beam apparatus art has featured a hollow cathode structure having perforated side walls and an aperture in the bottom end wall through which an electron beam is emitted from the cathode. Such cathode is maintained at a high negative potential relative to the anode which comprises a housing enclosing the cathode, and is operable in a low pressure ionizable gaseous medium. In operation, a plasma of ionizable gas forms both internal and external to the cathode due to interaction of the gaseous medium, high potential, and perforated side walls. The electron beam emits from the internal plasma and passes through the aperture in the bottom end wall.

While the hereinabove described apparatus using a perforated cathode is satisfactry for welding, heating, and irradiation applications, certain improvements may be desirable to obtain a more efficient code having improved operating characteristics. In particular, it may be more convenient to provide a cathode structure which does not generate an external plasma around the side walls and thereby obtains a greater efficiency in operation since the power necessary to maintain such external plasma is a power loss.

Therefore, still another object of my invention is to provide an apparatus comprising a hollow cathode structure having improved efficiency and operating characteristics.

Certain improvements may also be desirable to control the electron beam more effectively by providing a means for automatically stabilizing the beam intensity and focus during spurious variations in the gas pressure rather than by manually controlling such pressure. The gas pressure may vary due to liberation of gas or evaporation of material from the surface of the beam irradiated workpiece and by gas evolving from the interior walls of the housing due to radiant heat emitted by the irradiated workpiece.

Therefore, still another object of my invention is to provide an automatic gas pressure control for an electron beam apparatus of the gaseous beam type.

Finally, it may be more convenient to provide a means for automatically stabilizing the beam intensity during spurious variations in the gas pressure or in the cathode supply voltage which provides the high negative potential rather than by manually controlling this parameter.

Therefore, another object of my invention is to provide a means for maintaining an automatic stabilization of beam intensity during moderate variations in the gas pressure and cathode supply voltage.

Briefly stated, and in accordance with my invention, I provide a hollow cathode structure having imperforate side walls and a single aperture in an end wall through which a beam of electrons may be emitted. The cathode structure is arranged within a housing containing a low pressure ionizable gas and is maintained at a high negative potential relative to the housing. An electrically conductive shield substantially surrounds the cathode and is maintained at the voltage of the housing. A control electrode structure is arranged within the cathtode structure and is provided with an aperture aligned with the cathode aperture through which the electron beam passes. The control electrode structure may be electrically insulated from the cathode whereby the intensity of the electron beam is varied by controlling a low potential between the control electrode and cathode, or may be electrically connected to the cathode.

I further provide circuits for developing electrical signals which are functions of selected operating characteristics, such as beam focus, magnitude of beam current, beam power, and temperature of the workpiece being irradiated by the electron beam. Such signals are utilized individually or in various combinations and compared with a reference voltage representing a desired value of the selected characteristic. A deviation from the desired value produces an error signal to actuate an electromechanical transducer which adjusts a gas valve to control the pressure of the gaseous medium within the housing and thereby regulate the electron beam to its desired condition.

Finally, I provide an electrical circuit comprising adjustable resistances which couple the cathode to the control electrode for automatically regulating the magnitude of beam current during moderate variations in the gas pressure or cathode supply voltage.

The electron beam thus produced is especially useful in high quality metal working such as cutting, welding, brazing, and also in fusing dissimilar materials including refractory substances such as ceramics, high melting point metals, and ceramic-to-metal seals wherein processing temperatures as high as 3000° C. are required.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same character reference and wherein:

FIGURE 1 is an elevation view, partly in section, illustrating a first embodiment of an electron beam irradiation apparatus constructed in accordance with my invention;

FIGURE 2 is an enlarged detail view of a second embodiment of such apparatus and includes an automatic beam current stabilization circuit;

FIGURE 3 is a bottom view of the cathode, shield, and control electrode illustrated in FIGURE 2;

FIGURE 4 is an enlarged detail view of a third embodiment of the apparatus shown in FIGURE 1 and includes a second embodiment of a beam current stabilization circuit;

FIGURE 5 is an enlarged detail view of a fourth embodiment of such apparatus;

FIGURE 8 illustrates a typical family of curves indicating the variation of the magnitude of cathode current with cathode voltage for various pressures of an argon gaseous medium maintained in the region of the cathode;

FIGURE 9 illustrates a family of curves indicating the variation of the magnitude of cathode current with cathode voltage for various control electrode-to-cathode potentials and applicable to the apparatus of FIGURE 2;

Figure 6:
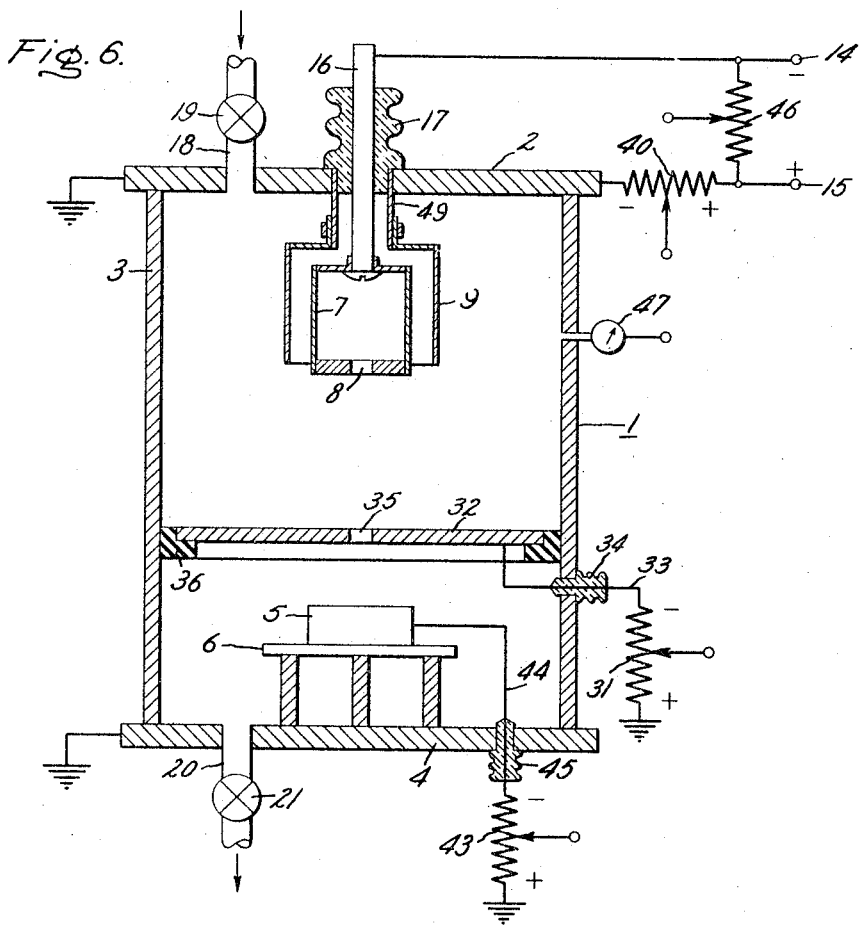
FIGURE 6 is an elevation view, partly in section, illustrating a fifth embodiment of such apparatus and includes a plurality of circuits for developing electrical signals which represent selected operating characteristics of the apparatus.

In FIGURE 1 there is shown a housing designated as a whole by numeral 1, preferably of cylindrical shape, although other forms may also be employed. Housing 1 comprises a top end plate 2, hollow cylindrical wall 3, and bottom end plate 4, joined by well-known methods. End plates 2 and 4 are constructed of an electrically conductive material, such as metal, and wall 3 may also be constructed of such material or, alternatively, may be made of a nonporous, transparent, heat-resistant material to permit visual observation of the generated electron beam and its effect on an irradiated material or workpiece 5 being processed by the beam. Workpiece 5 is maintained in alignment with the electron beam by means of movable support member 6 which may comprise a container disposed on bottom end plate 4 and constructed of copper or other suitable good electrically conductive and heat conductive material. Support member 6 may be supplied with an appropriate cooling medium (not shown) for such high temperature applications as the welding or melting of materials such as tungsten, molybdenum, and tantalum. The anode of the electron beam apparatus primarily includes housing 1 and container 6. Suitable means (not shown) are provided to remove container 6 from housing 1 and thereby facilitate the insertion and withdrawal of material 5 being processed therein.

The electron source consists of a hollow enclosed, imperforate, cathode structure 7, preferably in the form of a cylinder although other shapes may be employed, with a single aperture 8 in the center of a bottom end wall thereof wherefrom an electron beam is emitted by nonthermionic means in a manner to be described in detail hereinafter. This hollow cathode is constructed from an electrically conductive material which has a relatively high melting point to avoid melting at the temperature to which the cathode may be subjected at high beam intensity even though no heat source as such is utilized and preferably must not emit significant amounts of gas at this temperature. In general, the bottom end wall is made of molybdenum. A preferred embodiment of the cathode for high temperature applications is constructed from a sheet of molybdenum, although the top end wall may be constructed of stainless steel or copper. The cathode is conveniently assembled by welding or brazing the end walls to the cylinder.

An electrically conductive shield 9 made of sheet metal such as stainless steel surrounds cathode 7 in concentric relationship and is electrically insulated therefrom. The spacing between the cathode and shield is sufficiently small to prevent a glow discharge in that space. This spacing is dependent on the cathode voltage, gas pressure, and cathode and shield geometry. Thus, the function of shield 9 is to suppress any tendency for a glow discharge to be generated external of cathode 7 in a region between the top and side walls of cathode 7 and housing 1. The shield further aids in creating a suitable electric field distribution for beam mode operation of the cathode, and it is quite difficult to operate such a cathode without shield 9. Shield 9 may be of the same configuration as the cathode, thus, is preferably cylindrical, and has an open bottom end. Shield 9 is connected to top end plate 2 by a suitable means such as a metallic tubular member 49 whereby shield 9 is operable at the same potential as top end plate 2 relative to the cathode. A conventional clamping means 10 permits axial adjustment of shield 9 with respect to cathode 7. A preferable adjustment of shield 9 is to a position whereby the bottom end thereof is slightly above the aperture end of cathode 7. This position obtains desirable operating characteristics for my apparatus.

An electron beam apparatus comprising a structure including only cathode 7 and shield 9 has the disadvantage of developing high current surges when the beam is initiated. This difficulty is overcome by introducing a control electrode 11 inside the cathode. The cathode operation is markedly improved by the use of this electrode, and beam current can be smoothly varied over a considerable range by controlling cathode voltage and maintaining a constant gas pressure. Control electrode 11 comprises an electrically conductive structure which may be made of the same material as the cathode and has an aperture 12 substantially aligned with cathode aperture 8. A control electrode as herein recited is defined as any structure disposed internal to cathode 7 which affects the operation of the cathode and may be electrically connected or electrically insulated therefrom. A first embodiment of the control electrode, as illustrated in FIGURE 1, comprises a ring shaped member 11 positioned adjacent the aperture end of cathode 7 and supported therefrom by a plurality of electrically conductive members 13 whereby control or ring electrode 11 and cathode 7 operate at the same voltage.

The output of a direct current power supply providing a controlled output voltage is connected to terminals 14 and 15. The negative polarity of the output voltage is connected to terminal 14 and the positive polarity to terminal 15. For many applications, housing 1 is at ground potential as illustrated. The output voltage is adjustable from 0 to approximately 30 kilovolts, and for some applications may be as high as 200 kilovolts. The power supply rating is dependent on the particular application and may be in the order of 30 kilowatts. Cathode 7 is supported within housing 1 by means of cathode stem 16 which is insulated from top end plate 2 by means of insulating bushing 17. Stem 16 is an electrically conductive solid or hollow member which may be cylindrical in form and made of stainless steel. The solid form may be employed when no external connection is provided to the control electrode as in FIGURES 1, 5, and 6 and the hollow form is utilized with such external connection as in FIGURES 2, 4, and 10. The cathode is connected to the stem by suitable means such as welding, brazing a threaded shoulder and set screw arrangement depicted in FIGURE 5 or a screw inserted axially into the stem as in FIGURE 6. Negative terminal 14 is connected to stem 16 whereby cathode 7 is operable at a relatively high negative potential with respect to the anode.

A suitable gas, such as argon, helium, or hydrogen, is introduced into the interior of housing 1 through passage means 18 which may pass through any wall of housing 1 and for illustrative purposes is shown as passing through top end plate 2. Passage means 18 is connected to a gas supply (not shown) through throttle valve 19 which regulates the rate of gas flow into housing 1. A second passage means 20 is preferably located in a wall of housing 1 remote from passage means 18 and is illustrated as passing through bottom end wall 4. Passage 20 preferably has a larger size in cross section than passage 18 and provides a low impedance exit for any objectionable gas which may be generated by the beam irradiated workpiece 5. An exhaust pumping device (not shown) is connected to passage 20 through regulating valve 21 and aids in maintaining a desired gas pressure within housing 1. Thus, possible contamination of the cathode by undesired gases generated by the irradiated material 5 is largely prevented with such an exhaust system. The use of a hollow cathode stem 16 necessitates a suitable means for assuring a gas-tight seal within the interior thereof. Thus, a hollow cathode stem may be closed on one end thereof or filled with an electrically nonconductive, nonporous material, as in the embodiments illustrated in FIGURES 2 and 4.

One theory for explaining the principle of electron beam formation and ejection from the hollow cathode is as follows: The interior of the cathode cavity comprises a glowing body of plasma or ionized gas being generated by the interaction of the low pressure gaseous medium and the high negative cathode potential. This body of plasma is separated from the cathode walls by a less luminous sheath which is bounded by the walls. The potential distribution inside the cathode allows emergence of a stream of electrons from the plasma and this initiates the beam formation. Stable operation of such beam is aided by the action of control electrode 11 which modifies the impedance presented to the electron beam. Electron beam generation is initiated by first providing the cathode with the desired voltage from the power supply and subsequently introducing the gaseous medium to the interior of housing 1 and increasing this gas pressure to a selected level. The alternative method of first providing the selected pressure of gaseous medium and subsequently supplying the cathode voltage is less desirable since an unstable condition may be produced thereby. Thus, an electrical circuit is first completed between the cathode and the power supply, and the voltage is increased to a predetermined operating value. The gaseous medium is then introduced to the interior of housing 1 by opening valve 19. At gas pressures below a first critical value, a glow or diffuse type discharge fills the interior of housing 1. At a slightly increased pressure, a perceptible external glow region develops directly below the cathode. A further increase in gas pressure effects a second generation of a glowing body of plasma which is located within the cathode cavity, and beam mode operation is attained. This internal plasma is produced by the penetration of positive ions from the external glow into the cathode cavity. A further gradual increase in pressure generally effects a focusing action on the electron beam whereby the beam gradually achieves its most collimated condition and then defocuses as the pressure is still further increased. Finally, increasing the pressure above a second critical value may re-establish a diffuse type discharge. The critical range within which beam mode operation exists is dependent primarily on the gaseous medium employed and to a lesser degree on the cathode voltage and geometry. A typical critical pressure range for beam mode operation in an argon medium and a cathode voltage of 20 kilovolts is 5 to 12 microns.

A specific embodiment of the electron beam apparatus illustrated in FIGURE 1 employs a cylindrical cathode structure 1⅝ inches long, 1⅛ inches outside diameter, and a wall thickness of 0.010 inch. Open end cylindrical shield 9 has a length of 2 inches, an outside diameter of 1¾ inches, a wall thickness of 0.005 inch and is adjusted in an axial direction with respect to cathode 7 whereby the aperture end of the cathode extends approximately 1/16 inch beyond the open end of shield 9. Control electrode 11 is positioned ⅛ inch above the aperture end of cathode 7 and has an outside diameter of ⅞ inch and an inside diameter of 5/16 inch which is the same dimension as cathode aperture 8. Electrode 11 is formed from a similar 0.010 inch thick sheet of molybdenum as the cathode. An electron beam apparatus having the above dimensions is capable of generating an electron beam having a power of over 2.5 kilowatts which can be concentrated in a cross-sectional area of less than 0.01 square inch. The cathode, control electrode, shield, supporting members 16, 49, and insulator 17 are conveniently assembled as a unitary structure or electron gun which is partially inserted into housing 1 through top end plate 2 and secured thereto. The volt-ampere curves of FIGURE 8 were obtained for the above-described apparatus operating in an argon medium. It may be observed that cathode currents as high as 100 milliamperes are readily obtainable with such cathode size wherein the actual beam current is less than the cathode current. The difference in currents is due primarily to the power loss in the external glow region directly below the cathode. The ring electrode also permits stable short duration operation at 20 to 25 kilovolts and a peak beam current as high as 500 milliamperes. A longer duration of cathode operation at such higher levels of beam current necessitates constructing housing 1 of molybdenum and providing adequate cooling within cathode stem 16 to prevent damage to the gas seal at the elevated temperatures generated by such high beam current.

The control or ring electrode of FIGURE 1 may be supported from a second electrically conductive tubular member or stem 22 passing coaxially through cathode stem 16 as shown in FIGURE 2. Stem 22 is electrically insulated from stem 16 and this insulation also forms a gas-tight seal. With this arrangement, members 13 as shown in FIGURE 1 are no longer utilized and electrode 11 is supported from a disk shaped member 23. Member 23 is suitaby connected to stem 22 whereby electrode 11 remains in a fixed concentric position relative to cathode 7 and spaced therefrom. Electrode 11 is connected to disk 23 by means of a plurality of support members 24, it being understood that disk 23 and members 24 are spaced from cathode 7 and are constructed of an electrically conductive material such as molybdenum. Thus, electrode 11 is electrically insulated from cathode 9 within housing 1. FIGURE 3 is a bottom end view of the electron beam apparatus illustrated in FIGURE 2 and indicates the concentric relationship of shield 9, cathode 7, and electrode 11.

Control of the beam intensity, that is, the total current within the electron beam, over a substantial range of beam current may be obtained by adjusting the gas pressure or cathode voltage. However, the beam is not self-focusing, that is, the beam intensity is not controllable independently of the focus. Thus, a significant change in beam intensity changes the beam focus and under certain conditions may cause the cathode discharge to pass out of the beam mode and become a diffuse type discharge. It can be appreciated that for applications such as welding, brazing, or cutting, an electron beam having a high power concentration, that is, a finely focused or collimated beam, is generally desired over a wide range of beam intensity control.

The beam intensity is controllable without appreciably affecting its focus and without adjustment of the gas pressure and cathode voltage by employing the control electrode configuration illustrated in FIGURE 2. Smooth control of cathode and beam current is obtained by varying the potential of control electrode 11 with respect to cathode 7 as illustrated by the curves in FIGURE 9. FIGURE 9 indicates the volt-ampere characteristics of the above-described apparatus in an argon medium at 10 microns pressure for various biases or negative potentials of electrode 11 relative to cathode 7. An electrical circuit comprising a switch device 25, a variable resistance such as rheostat 26, and a second variable resistance such as potentiometer 27, electrically couples control electrode 11 to cathode 7. Resistances 26 and 27 provide the desired control electrode-to-cathode operating potential and also provide a self-regulation or automatic stabilization of the electron beam current. It should be understood that this potential could also be provided by a low voltage power source. Thus, proper adjustment of these resistances permits operation of my electron beam apparatus in the negative or positive control electrode-to-cathode potential region. The curves of FIGURE 9 illustrate the operation of my apparatus in the region of negative control electrode-to-cathode potential. Upon proper adjustment of resistances 26 and 27, a change in beam current, due to moderate changes in the high voltage supplied to terminals 14 and 15 or changes in the pressure of the gaseous medium within housing 1, is automatically corrected by the changes in voltage drops across resistances 26 and 27 produced by the changing currents flowing therethrough. The net change in these voltage drops is in such direction as to restore the beam current to its original value. The use of merely one of the resistances 26 or 27 will provide the desired control electrode-to-cathode potential and stabilizing action for only a single polarity of such potential. The potential for many applications is adjustable over a range of 0–200 volts.

Switch 25 may be a manually operated mechanical switch or an electrical type such as a relay, vacuum tube, or semiconductor device, operable in an electrical circuit which provides a desired control function. With switch 25 in the open position, control electrode 11 assumes a positive floating potential of approximately 250 to 300 volts with respect to the cathode and such potential effectively cuts off the electron beam. Under these conditions, the cathode operates in a low power mode with an external glow immediately below the aperture end of cathode 7. This low power operation maintains the electron beam apparatus in a stand-by condition and keeps it outgassed, that is, prevents the cathode surface from becoming contaminated by residual gases. Such contamination can occur when the apparatus is deenergized whereby the cathode absorbs some residual gases on cooling. A subsequent closure of switch 25 connects the floating electrode to the cathode voltage and initiates full beam output. This technique is especially appropriate for a plurality of successive welding operations.

Referring particularly to FIGURE 4, there is shown an electron beam apparatus similar to that illustrated in FIGURE 2 but including a structure 28 shaped in general conformity to the cathode and spaced from its side walls. Such structure may be constructed of the same material as cathode 7 and comprises a hollow cylinder having a perforated or screen surface. The cylindrical screen is connected at its ends to disk member 23 and ring member 11, respectively. Screen 28 is adapted to surround the plasma which is internal to cathode 7 and permits a smaller control electrode-to-cathode potential to produce the same beam current control obtained for the structure illustrated in FIGURE 2. A second embodiment of an automatic stabilization circuit for the electron beam current is illustrated in FIGURE 4. In this particular circuit, a potentiometer 29 is connected in the control electrode circuit and a source of direct current voltage, such as for example, battery 30, is connected across potentiometer 29. The polarity of voltage source 30 and the position of the movable arm of potentiometer 29 in combination with the adjustment of potentiometer 27 determines the control electrode-to-cathode potential and, thus, the operating point on static characteristic curves which are similar to those indicated on FIGURE 11. The voltage drop due to control electrode current flowing through the portion of potentiometer 29 between the movable arm thereof and the movable arm of potentiometer 27 should be negligible with respect to the proportional voltage of source 30 across such resistance portion. Thus, a substantially fixed voltage exists across such section of potentiometer 29 which is in the control electrode and cathode circuits and the current stabilizing action is determined primarily by changes in voltage drop occurring across cathode potentiometer 27. The polarity of source 30 is selected to permit operation of the electron beam apparatus in the negative control electrode volts region of the characteristic curve. Screen structure 28 attains a floating or beam cut-off potential of approximately 1500 volts with respect to cathode 7 when switch 25 is open. Adequate insulation must thus be provided to prevent arcing between the control electrode structures 23, 28, 11, and cathode 7 at such condition.

FIGURE 5 illustrates a fourth embodiment of my electron beam apparatus employing a different control electrode structure. This particular structure comprises an electrically conductive ring shaped member 11 having a serrated outer edge connected to the side wall of cathode 7. Member 11 is spaced a relatively small distance from the aperture end of the cathode to form a double bottom walled cathode structure. Aperture 12 of ring shaped member 11 has substantially the same dimension as cathode aperture 8 and is aligned therewith as previously described.

FIGURE 6 illustrates a fifth embodiment of my invention. This structure is similar to that illustrated in FIGURE 5 with the exception that the double bottomed arrangement of FIGURE 5 is modified to a single but considerably thicker aperture end of cathode 7. This structure is more durable than that of FIGURE 5 and is especially appropriate to high beam intensity applications. The thickness dimension of the aperture end of cathode 7 may be in the order of ⅛ inch.

Figure 10:
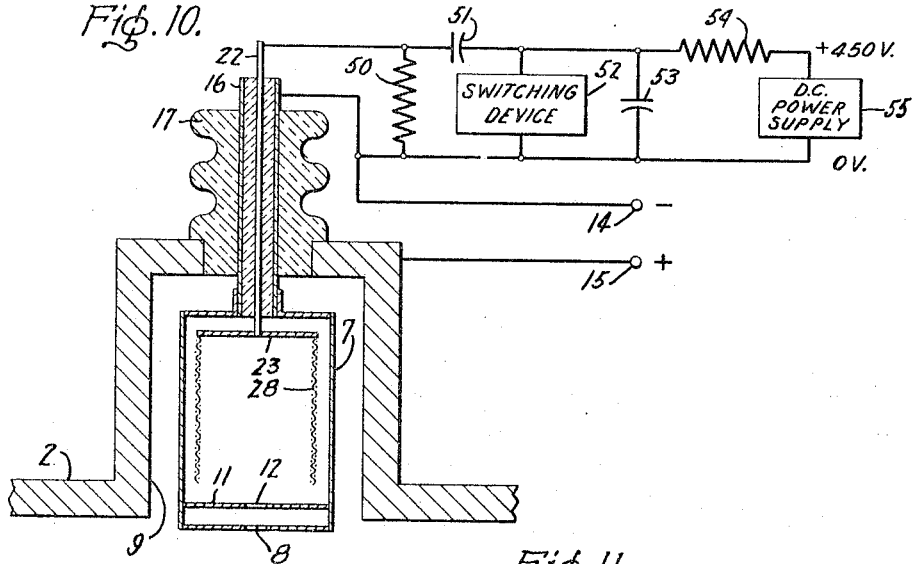
FIGURE 10 is an enlarged detail view of a sixth embodiment of the apparatus and includes a circuit for obtaining pulsed beam operation.

The exit aperture of the electron gun assembly may comprise a single aperture, as shown in FIGURE 6, or a plurality of two, as shown in FIGURES 5 and 10, or more aligned apertures. The geometry of the exit aperture 8 (exit canal) determines the impedance presented to the electron beam being emitted from the cathode cavity. The dimensions of the exit canal must be such as to provide sufficient impedance to obtain stable operation of the electron beam. These dimensions may be determined from the ratio of the cathode bottom end wall thickness to aperture diameter wherein this ratio must be greater than a predetermined value for stable operation.

Modification of the configuration of the exit canal modifies the impedance presented to the electron beam. Thus, rather than employing a thicker cathode bottom end wall (or aperture of smaller diameter) or a plurality of bottom end walls, the exit canal may comprise a reentrant or external tubular member which is connected to the cathode bottom end wall.

Figure 7:
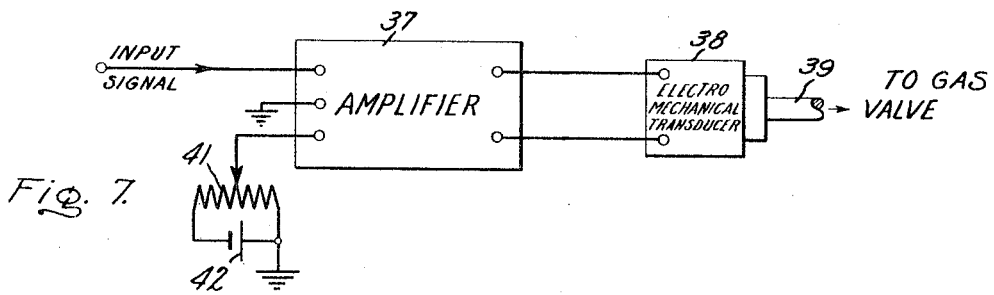
FIGURE 7 illustrates a circuit for converting the electrical signals developed in FIGURE 6 to a mechanical motion for controlling gas pressure within the apparatus.

FIGURE 6 in conjunction with FIGURE 7 illustrates a further improvement in my electron beam apparatus, in particular, a provision for automatically stabilizing the beam intensity and focus during spurious variations in the gas pressure by automatically controlling the gas pressure rather than by a manual control thereof. The gas pressure may vary due to liberation of gas or evaporation of material from the surface of the beam irradiated workpiece 5 and gas evolving from the interior walls of housing 1 due to radiant heat emitted by the irradiated workpiece. The electrical power supply for the cathode is provided with conventional voltage regulation having an adequate accuracy, thus the remaining variable parameter which should be controlled to obtain a well-controlled electron beam is the pressure of the gaseous medium contained within housing 1. I control the gas pressure within my apparatus by providing a circuit for developing an electrical signal which is a function of a selected operating characteristic and comparing such signal with a reference voltage which represents a desired value of the selected characteristic. Variation from such desired value is employed to actuate an electromechanical transducer which adjusts either one or both of gas valves 19 and 21 to thereby control the pressure and regulate the electron beam to its desired condition. The magnitude of the change in the electron beam intensity for changes in gas pressure at constant cathode voltage can be appreciated by reference to FIGURE 8. The pressure of the gaseous medium is adjustable up to a required pressure, the particular pressure range necessary to maintain beam mode operation being dependent on the cathode voltage and particular gas employed. A precise regulation of the gas pressure provides the desired control of operating characteristics which is necessary for high quality metal working such as cutting, welding, and brazing.

The gaseous medium as herein recited is defined as ordinary unsaturated gases, such as argon and helium; and saturated vapors such as mercury and cesium, each in contact with their respective liquid phase. Use of saturated vapors may alleviate the need for an external gas pressure control since the pressure of such gaseous medium is determined primarily by the temperature of the liquid phase. Thus, a pool of heated mercury may be located in the workpiece chamber, and an exhaust system removes an undesired gases emitted by the beam irradiated workpiece. The gas pressure then remains relatively constant and can be accurately varied by adjusting the temperature of the liquid mercury.

FIGURE 6 indicates a plurality of circuits which may be employed for sensing particular characteristics of the electron beam and other operating characteristics and for generating appropriate signals therefrom for use in a control system which regulates gas valve 19 or 21. The control system is schematically illustrated in FIGURE 7.

A first electron beam characteristic which may be sensed and controlled is beam focus. An electrical circuit for sensing changes in beam focus includes potentiometer 31 connected to a partition member 32 by means of electrical conductor 33 which passes through insulating bushing 34 disposed in a wall of housing 1. Partition member 32 may be made of the same material as housing 1, that is, an electrically conductive material, and is provided with an aperture 35 that is aligned with cathode aperture 8 and the workpiece 5 being irradiated by the electron beam. Partition member 32 is electrically insulated from housing 1 by means of an electrically nonconductive support ring 36. In the presence of a change in gas pressure at constant cathode voltage, the electron beam defocuses and is partially intercepted by partition member 32 since aperture 35 is of size sufficient to pass only a beam of selected cross section. The portion of the electron beam intercepted by partition member 32 causes electrons to flow through potentiometer 31. The movable arm of potentiometer 31 supplies a portion of the voltage drop, generated across potentiometer 29 by the intercepted electrons, as an input signal to a servo control amplifier 37 which may be of a conventional electronic or magnetic type as illustrated in FIGURE 7. An electromechanical transducer 38 which may comprise a direct current motor and suitable gearing is connected to the output of amplifier 37 and drives valve shaft 39 of valve 19 or 21. The control action is obtained in the following manner: During normal operating conditions of constant cathode supply voltage and gas pressure, there is no electron interception by partition member 32 and therefore no resulting current flow through potentiometer 31. Thus, there is no output error signal from amplifier 37 and valve shaft 39 is not driven by transducer 38. During a spurious variation in the gas pressure, which causes the electron beam to diverge or defocus, the beam is partially intercepted by partition member 32, resulting in a current flow through potentiometer 31 which is proportional to the degree of divergence of the electron beam. The magnitude of the resultant voltage drop across potentiometer 31 determines the magnitude of the input signal to amplifier 37 and thereby determines the amount of rotation of valve shaft 39 which adjusts gas pressure valve 19 or 21 in a direction to restore the initial beam condition. Partition member 32 has an added function of preventing appreciable flow of any contaminating gas which is generated by the irradiated workpiece 5 from passing into the upper chamber and contaminating cathode 7. A plurality of partition members 32 may be utilized whereby additional exhaust pumping may be provided to assure an even less contaminating atmosphere. The use of additional partition members and gas pumping means is also a convenient method for operating the lower or workpiece chamber at a higher or lower gas pressure than the upper or cathode chamber. This feature also permits the workpiece chamber to be operable in a gaseous medium which is different from the gas employed in the cathode chamber. Thus, the gaseous medium in the workpiece chamber may comprise a different gas or combinations of gases and vapors, including atmospheric air.

A second electron beam characteristic which may be sensed and controlled is beam intensity or current. It is noted from FIGURE 8 that beam current varies as a direct function of gas pressure. An electrical circuit for sensing the beam current alone is provided by connecting a potentiometer 40 in series between positive voltage terminal 15 and housing 1. The movable arm of potentiometer 40 supplies a proportional voltage drop across potentiometer 40 as an input signal to amplifier 37. A second input to amplifier 37 is provided from an electrical circuit comprising reference potentiometer 41 and a direct current voltage supply such as a battery 42 connected across potentiometer 41. This particular control circuit functions in the following manner: During normal operating conditions of constant voltage and gas pressure, the desired beam current flowing through potentiometer 40 provides an input signal to amplifier 37. The movable arm of reference potentiometer 41 is adjusted to provide a voltage equal and opposite to the input signal from potentiometer 40. Thus, during steady state conditions there is no output from amplifier 37 and the gas valves remain unaffected. In the presence of a spurious increase in gas pressure, beam current increases and the greater voltage drop resulting across potentiometer 40 provides an output error signal to amplifier 37 which adjusts gas valve 19 or 21 in a direction to restore the initial current.

A third embodiment of my automatic gas pressure control senses both beam focus and beam current. A potentiometer 43 is electrically coupled to workpiece 5 by means of electrical conductor 44 passing through an insulating bushing 45 disposed in a wall of housing 1. Potentiometer 43 performs a function similar to that of potentiometer 40, it being understood that aperture 35 must be sufficiently large in this case to prevent any interception of the electron beam by partitioning member 32. Alternatively, aperture 35 may be maintained at a size merely sufficient to pass a well-focused electron beam therethrough. The input signals represented by the voltage supplied by the movable arm of potentiometer 43 then represent a function of both variation in electron beam intensity and focus.

A fourth embodiment of my gas control system senses and regulates electron beam power. A suitable circuit (not shown) is provided for combining a beam current signal with a signal which is a function of the cathode voltage. Thus, electrical signals supplied from potentiometer 40 and potentiometer 46, which measure the cathode voltage, are combined in a conventional electronic multiplying circuit to produce an electrical signal proportional to the electron beam power.

A fifth embodiment of my gas pressure control directly senses the gas pressure. A gas pressure gage 47, which is suitable for measuring pressures in a range up to at least 50 microns is conveniently employed as a sensing element to provide an input signal to an amplifier 37.

Gage 47 is connected in a wall of housing 1 to sense the gas pressure in the region of cathode 7.

The signals developed by the various potentiometers and gas pressure gage illustrated in FIGURE 6 may be used individually or in various combinations to provide input signals to amplifier 37 which represent particular operating conditions. Thus, during the initial interval of beam formation, a shield may be placed between aperture 35 and workpiece 5 whereby the workpiece is shielded from the beam and potentiometer 40 employed to obtain the desired beam current and potentiometer 31 to obtain the desired beam focus. Upon obtaining the desired beam conditions, the shield is removed and potentiometers 40 and 31 may continue in operation, or, one or both may be removed and another of the sensing circuits may be employed to provide the input signal to amplifier 37.

A specific method of processing workpiece 5, preferably includes the following steps: The cathode voltage is adjusted to a desired value and gas pressure gage 47 is employed to provide the input signal to amplifier 37 whereby the gas pressure within housing 1 is adjusted to its desired value. At the desired gas pressure, a beam current signal overrides the gas pressure signal to thereby regulate the beam to its desired current. Finally, at the desired beam current, a workpiece temperature signal overrides both the pressure and current signals to regulate workpiece temperature. The temperature of the workpiece being processed can be measured by conventional pyrometric methods (not shown) and an electrical signal derived therefrom is employed as an alternative or additional input to the servo amplifier.

FIGURE 10 illustrates a sixth embodiment of my electron beam apparatus. Whereas shield 9 of the previous embodiments has been a separate structure extending away from top end plate 2, such shield may be an integral portion of plate 2, since it operates at the same potential. Thus, FIGURE 10 discloses shield 9 as being a cylindrical recess in top end plate 2. The double bottomed cathode of FIGURE 5 is also utilized in FIGURE 10. In addition, the cylindrical screen structure 28 of FIGURE 4 is employed but having an open bottom end spaced member 11. An advantage of this configuration is the elimination of any possible misalignment between apertures 8 and 12 in FIGURE 4.

Figure 11:
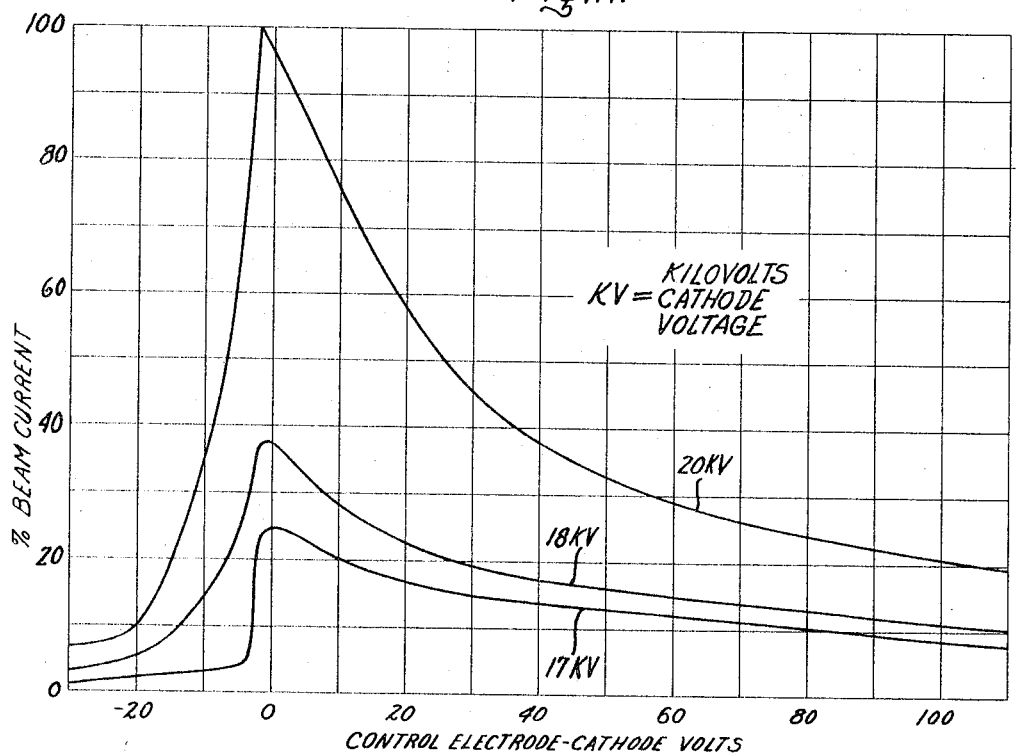
FIGURE 11 illustrates a family of curves indicating the variation of the magnitude of beam current with control electrode-to-cathode potential for various cathode voltages and applicable to the apparatus of FIGURES 4 and 10.

The curves of FIGURE 11 indicate the operating characteristics of the apparatus of FIGURE 10 in an argon gaseous medium of 10 microns pressure. The ordinate of this graph represents beam current normalized to 100 percent. It may be noted that the apparatus is operable with either polarity of control electrode-to-cathode potential, the control electrode being here considered as screen structure 28.

FIGURE 10 also illustrates an electrical circuit for obtaining pulsed beam operation of my apparatus. The circuit comprises a resistance 50 connected between cathode 7 and control electrode 28, and coupling capacitance 51 and a switching device 52 serially connected in parallel with resistance 50. Capacitance 53 is connected in parallel with switching device 52, and a series circuit comprising resistance 54 and direct current power supply 55 is connected in parallel with capacitance 53. Switching device 52 may comprise an electron tube or semiconductor device which is actuated or triggered into operation by a pulsed control signal. As a specific example, device 52 is a hydrogen thyratron tube, resistance 50 is 30 megohms, capacitance 51 is 0.50 microfarad, capacitance 53 is 0.05 microfarad, resistance 54 is 10,000 ohms, and power supply 55 has an output of 450 volts. The circuit functions in the following manner: With no control signal input to the grid of thyratron 52, the control electrode-to-cathode potential is +450 volts which is a beam cut-off condition as seen in FIGURE 11. The application of a pulsed control signal to the thyratron grid renders the thyratron conductive and momentarily reduces the control electrode-to-cathode potential to substantially zero volts, thereby initiating a pulsed beam output from cathode 7. The particular time constant determined by capacitance 53 and resistance 54 produces a pulsed beam having a duration of 0.5 microsecond. It should be obvious that many other switching circuits are also capable of producing pulsed beam operation of my apparatus. The pulse response is dependent on the gaseous medium contained within housing 1. Thus, the gases having lower molecular weights, such as helium or hydrogen, are preferred for short duration pulse operation.

From the foregoing description, it can be appreciated that my invention makes available an electron beam apparatus comprising a new electron gun assembly for generating a well-collimated electron beam by non-thermionic means and within a relatively low pressure ionizable gaseous medium. The electron beam is produced by a plasma which is generated within a hollow, imperforate, cathode structure by interaction of the gaseous medium and a relatively high negative potential existing between the cathode and the housing which contains the cathode and gaseous medium. The beam is emitted from the cathode by means of a single aperture therein. A control electrode is positioned within the cathode structure and adjacent to the cathode aperture. The control electrode in combination with a shield substantially surrounding the cathode provides stable and highly efficient operation of the cathode. The shield also permits the cathode to be operated in a relatively constricted space in the region above the cathode. The electron beam may be adjusted over a wide beam current range and made self-focusing by applying a relatively low potential between the cathode and a particular configuration of the control electrode. This self-focusing feature permits elimination of the conventional beam focusing techniques normally employed in high vacuum, thermionically emitting electrode electron beam generators. However, such focusing techniques may also be employed with my apparatus to provide an independent focus adjustment of the beam as dictated by the particular application or to obtain further concentration of the beam energy into an area less than 0.001 square inch. Electrostatic field shaping electrodes operable at various voltages may be employed to further modify the electron beam characteristics and the concentration and distribution of positive ions being attracted to the cathode. I also provide an electrical circuit for automatically stabilizing the magnitude of the electron beam current for moderate changes in the cathode voltage supply or gas pressure. Finally, I provide a control system for automatically controlling the gas pressure as a function of a desired beam characteristic or operating condition.

Having described a number of embodiments of a new and improved apparatus for generating an electron beam, it is believed obvious that modifications and variations of my invention are possible in the light of the above teachings. Thus, various configurations of the ring or control electrode contained within cathode 7 may be employed. Also, alternating current voltages or any combination of direct and alternating current voltages may be applied to the cathode and control electrode structures to obtain modulated or pulsed electron beam. The gas pressure control may regulate both gas valves either alternately or simultaneously provided the proper directions are employed in driving the valve shafts which control the valves. The gas employed may include other suitable gases besides argon, helium, and hydrogen, and also a second servo control amplifier and electromechanical transducer may be employed in driving the second gas valve. It is, therefore, to be understood that changes may be made in the particular embodiments as described which are within the full intended scope of the invention as defined by the following claims.

What I claim as new and desire to secure by Letters Patent of the United States is:

1. In an electron beam apparatus, the combination of an enclosure containing a relatively low pressure ionizable gaseous medium,
   a cathode positioned within said enclosure and comprising a hollow electrically conductive structure imperforate except for a beam exit aperture, operating circuit means effective for operating said cathode at a potential sufficiently negative relative to an anode in the operating circuit to initiate and maintain a plasma within the cathode structure by the interaction of the gaseous medium and negative cathode-to-anode potential thereby to effect a nonthermionic electron beam mode of operation of said cathode wherein an electron beam issues from the plasma through said aperture.

2. In an electron beam apparatus, the combination of an enclosure containing a relatively low pressure ionizable gaseous medium,
   a cathode positioned within said enclosure and comprising a hollow electrically conductive structure imperforate except for at least one beam exit aperture, operating circuit means effective for maintaining said cathode at a potential sufficiently negative relative to an anode in the operating circuit to initiate and maintain a plasma within the cathode structure by the interaction of the gaseous medium and negative cathode-to-anode potential thereby to effect a nonthermionic electron beam mode of operation of said cathode wherein an electron beam issues from the plasma through said at least one beam exit aperture, and
   means surrounding the cathode for suppressing a glow discharge to the exterior of said cathode.

3. In an electron beam apparatus, the combination of an enclosure containing a relatively low pressure ionizable gaseous medium,
   a cathode positioned within said enclosure and comprising a hollow electrically conductive structure imperforate except for a single beam exit aperture, operating circuit means effective for maintaining said cathode at a potential sufficiently negative relative to an anode in the operating circuit to initiate and maintain a plasma within the cathode structure by the interaction of the gaseous medius and negative cathode-to-anode potential thereby to effect a nonthermionic electron beam mode of operation of said cathode wherein an electron beam issues from the plasma through said aperture, and
   an electrically conductive shield surrounding said cathode and electrically insulated therefrom, said shield being at a potential sufficiently positive with respect to said cathode to suppress any glow discharge exterior of said cathode.

4. The combination of an enclosure containing a relatively low pressure ionizable gaseous medium,
   a cathode positioned within said enclosure and comprising a hollow electrically conductive structure imperforate except for an exit aperture, operating circuit means effective for maintaining said cathode at a potential sufficiently negative relative to an anode in the operating circuit to initiate and maintain a plasma within the cathode structure by the interaction of the gaseous medium and negative potential thereby to effect a nonthermionic electron beam mode of operation of said cathode wherein an electron beam issues from the plasma through said aperture, and
   a control electrode comprising an electrically conductive structure positioned within said cathode, said control electrode having an aperture aligned with said cathode aperture whereby the electron beam is controlled 5. The combination of an enclosure including an electrically conductive section and containing a relatively low pressure ionizable gaseous medium,
   a cathode positioned within said enclosure and comprising a hollow electrically conductive structure, means for maintaining said cathode at a potential sufficiently negative relative to said conductive section of said enclosure to initiate and maintain a plasma within the cathode structure by the interaction of the gaseous medium and negative potential, said cathode having only a single aperture through which an electron beam issues from the plasma, and
   a control electrode comprising an electrically conductive structure positioned within said cathode, said control electrode being supported by said cathode and electrically connected thereto, said control electrode having an aperture aligned with said cathode aperture for obtaining stable operation of the electrode beam.

6. The combination set forth in claim 5 wherein said control electrode structure comprises an electrically conductive ring shaped member spaced from a wall of said cathode structure which contains said cathode aperture, said ring shaped member being aligned with said cathode aperture.

7. The combination set forth in claim 5 wherein said control electrode structure comprises an electrically conductive ring shaped member having its outer surface connected to the sides of said cathode and spaced a relatively small distance from the aperture end of said cathode to form a double walled construction having aligned apertures.

8. The combination of an enclosure including an electrically conductive section and containing a relatively low pressure ionizable gaseous medium,
   a cathode positioned within said enclosure and comprising a hollow electrically conductive structure, means for maintaining said cathode at a potential sufficiently negative relative to said conductive section of said enclosure to initiate and maintain a plasma within the cathode structure by the interaction of the gaseous medium and negative cathode potential, said cathode being imperforate except for an exit aperture through which an electron beam issues from the plasma, and
   a control electrode comprising an electrically conductive structure positioned within said cathode and electrically insulated therefrom, said control electrode having an aperture aligned with said cathode aperture whereby the intensity of the electron beam is varied by varying a low potential between said control electrode and cathode.

9. The combination of an enclosure containing a relatively low pressure ionizable gaseous medium,
   a cathode positioned within said enclosure and comprising a hollow electrically conductive structure, operating circuit means effective for maintaining said cathode at a potential sufficiently negative relative to an anode in the operating circuit to initiate and maintain a plasma within said cathode structure by the interaction of the gaseous medium and negative cathode-to-anode potential thereby to effect a nonthermionic electron beam mode of operation of said cathode, said cathode imperforate except for an exit aperture through which an electron beam issues from the plasma,
   means surrounding said cathode for suppressing glow discharge external of said cathode, and
   a control electrode comprising an electrically conductive structure positioned within said cathode, said control electrode having an aperture aligned with said cathode aperture whereby the electron beam is controlled.

10. The combination of an enclosure including an electrically conductive section and containing a relatively low pressure ionizable gaseous medium,
   a cathode positioned within said enclosure and comprising a hollow electrically conductive structure, means for maintaining said cathode at a potential sufficiently negative relative to said conductive section of said enclosure to initiate and maintain a plasma within the cathode structure by the interaction of the gaseous medium and negative potential, said cathode being imperforate except for an aperture through which an electron beam issues from the plasma,
   an electrically conductive shield surrounding said cathode and electrically insulated therefrom, said shield being operable at a potential sufficiently positive with respect to said cathode to suppress any glow discharge exterior of said cathode, and
   a control electrode comprising an electrically conductive structure positioned within said cathode, said control electrode supported by said cathode and electrically connected thereto, said control electrode having an aperture aligned with said cathode aperture.

11. The combination of an electrically conductive enclosure containing a relatively low pressure ionizable gaseous medium,
   a cathode positioned within said enclosure and comprising a hollow electrically conductive structure imperforate except for a beam exit aperture, means for maintaining said cathode at a potential sufficiently negative relative to said enclosure to initiate and maintain a plasma within the cathode structure by the interaction of the gaseous medium and negative potential thereby to effect a nonthermionic electron beam mode of operation of said cathode wherein an electron beam issues from the plasma through said aperture, said cathode having said aperture,
   an electrically conductive shield surrounding said cathode and electrically insulated therefrom, said shield being operable at the potential of said enclosure, and
   a control electrode comprising an electrically conductive structure positioned within said cathode and electrically insulated therefrom, said control electrode having an aperture aligned with said cathode aperture whereby the intensity of the beam is varied by varying a low potential between said control electrode and cathode.

12. An electron beam irradiation apparatus comprising an enclosure containing a relatively low pressure ionizable gaseous medium,
   a cathode positioned within said enclosure and comprising a hollow electrically conductive structure imperforate except for at least one beam exit aperture, operating circuit means for maintaining said cathode at a potential sufficiently negative relative to an anode in the operating circuit to initiate and maintain a plasma within the cathode structure by the interaction of the gaseous medium and negative cathode-to-anode potential thereby to effect a nonthermionic electron beam mode of operation of said cathode wherein an electron beam issures from the plasma through said at least one beam exit aperture,
   an electrically conductive shield surrounding said cathode and electrically insulated therefrom, said shield being operable at a potential sufficiently positive with respect to said cathode to suppress any glow discharge exterior of said cathode, and
   means for automatically controlling the pressure of the gaseous medium within said enclosure.

13. The combination set forth in claim 12 wherein said pressure controlling means is responsive to the magnitude of electron beam current.

14. An electron beam irradiation apparatus comprising an enclosure including an electrically conductive section and containing a relatively low pressure ionizable gaseous medium,
   a cathode positioned within said enclosure and comprising a hollow electrically conductive structure, means for maintaining said cathode at a potential sufficiently negative relative to said conductive section of said enclosure to initiate and maintain a plasma within the cathode structure by the interaction of the gaseous medium and negative potential, said cathode having only a single aperture through which an electron beam issues from the plasma,
   an electrically conductive shield surrounding said cathode and electrically insulated therefrom, said shield being operable at the potential of said conductive section of said enclosure,
   a control electrode comprising an electrically conductive structure positioned within said cathode and electrically insulated therefrom, said control electrode having an aperture aligned with said cathode aperture through which said beam passes whereby the magnitude of the current in said beam is varied by varying a low potential between said control electrode and cathode, and
   means connected in an electrical circuit which couples the cathode and control electrode for automatically regulating the magnitude of the beam current.

15. An electron gun assembly adapted for use in an electron beam welding apparatus and comprising
   a cathode comprising a hollow electrically conductive structure imperforate except for a beam exit aperture, said cathode having only a single said aperture in a bottom wall thereof through which an electron beam may issue from a plasma initiated and maintained within the cathode structure by an interaction of a gaseous medium in which the cathode structure is disposed and a sufficiently high negative voltage at which the cathode structure is maintained, the ratio of cathode bottom end wall thickness to aperture diameter being sufficiently high to effect stable operation of the electron beam, and
   an electrically conductive shield surrounding said cathode and electrically insulated therefrom, said shield comprising a recessed portion of a housing containing said electron gun assembly.

References Cited by the Examiner

UNITED STATES PATENTS

| | | | |
|---|---|---|---|
| 2,486,134 | 10/1949 | Elder | 313—207 X |
| 2,810,088 | 10/1957 | MacNair | 313—339 |
| 3,210,518 | 10/1965 | Morley et al. | 313—339 X |
| 3,218,431 | 11/1965 | Stauffer | 219—121 |
| 3,223,885 | 12/1965 | Stauffer | 315—111 |
| 3,243,570 | 3/1966 | Boring | 313—231 X |
| 3,262,003 | 7/1966 | Allen et al. | 313—207 |
| 3,262,013 | 7/1966 | Allen et al. | 315—326 |

JAMES W. LAWRENCE, *Primary Examiner.*

S. SCHNEEBERGER, *Examiner.*